United States Patent [19]

Nakano et al.

[11] Patent Number: 4,964,740
[45] Date of Patent: Oct. 23, 1990

[54] BEARING APPARATUS FOR A ROTARY MACHINE HAVING A HORIZONTAL ROTATING SHAFT

[75] Inventors: Masaaki Nakano, Hitachi; Tomoaki Inoue, Mito; Kazuhiko Kawaike, Katsuta; Yuji Yamamoto; Motoyuki Ishikawa, both of Hitachi, all of Japan

[73] Assignee: Hitachi, Ltd., Tokyo, Japan

[21] Appl. No.: 326,978

[22] Filed: Mar. 22, 1989

[30] Foreign Application Priority Data

Mar. 25, 1988 [JP] Japan .................................. 63-69489

[51] Int. Cl.⁵ ........................ F16C 33/66; F16C 33/10
[52] U.S. Cl. .................................... 384/313; 384/404
[58] Field of Search ................ 384/322, 397–407, 384/414, 462, 465, 467, 473, 313, 315, 317

[56] References Cited

U.S. PATENT DOCUMENTS

| | | | |
|---|---|---|---|
| 2,080,101 | 5/1937 | Trumpler | 384/313 |
| 3,098,683 | 7/1963 | Jernberg | 384/313 |
| 3,476,452 | 11/1969 | Hagg et al. | 384/404 |
| 3,635,578 | 1/1972 | Wagner | 384/404 X |
| 4,596,476 | 6/1986 | Schill et al. | 384/467 |

FOREIGN PATENT DOCUMENTS

| | | | |
|---|---|---|---|
| 581964 | 8/1959 | Canada | 384/313 |
| 961584 | 4/1957 | Fed. Rep. of Germany | 384/406 |
| 115246 | 9/1978 | Japan . | |
| 123346 | 9/1978 | Japan . | |

Primary Examiner—Thomas R. Hannon
Attorney, Agent, or Firm—Antonelli, Terry, Stout & Kraus

[57] ABSTRACT

A bearing apparatus for a rotary machine having a horizontal rotating shaft comprises a bearing for supporting the horizontal rotating shaft, a bearing box for supporting the bearing therein, a lubricating oil tank disposed in a lower portion of the bearing box for storing lubricating oil, a lubricating supply device for picking up the lubricating oil in the lubricating oil tank and supplying the lubricating oil to the bearing, and oil guide device disposed beneath the bearing and allowing the lubricating oil discharged from the bearing to flow along a side wall of the bearing box to be stored in the lubricating oil tank.

29 Claims, 4 Drawing Sheets

BEARING APPARATUS FOR A ROTARY MACHINE HAVING A HORIZONTAL ROTATING SHAFT

BACKGROUND OF THE INVENTION

The present invention relates to an improvement in a bearing apparatus for a rotary machine having a horizontal rotating shaft, and more particularly, to an improvement in a bearing apparatus in which lubricating oil is contained in a lubricating oil tank and is automatically supplied to a bearing by means of the rotation of the horizontal rotating shaft.

Hitherto, in automatically oil supplied type bearing apparatus which have been applied to the rotary machines, for example, a motor having a horizontal main shaft, a system has been employed in which an oil ring, an oil disk, a viscous pump or the like is provided in the bearing or in the vicinity of the bearing and the lubricating oil is picked up from the lubricating oil tank and supplied to the bearing by means of the rotation of the main shaft. In that system, the lubricating oil which has been supplied to the bearing and contributed to the lubrication of the bearing becomes higher in temperature due to the shearing and friction action and falls from the both ends of the bearing onto a surface of the lubricating oil in the lubricating oil tank. Therefore, the hot oil cannot mix with cold lubricating oil remaining adjacent to side walls and a bottom wall of the lubricating oil tank and is accumulated only in the upper portion of the lubricating oil in the tank. As a result, there results a problem that the radiation of the heat cannot be effectively performed.

In view of the foregoing, a bearing is disclosed in Japanese Utility Model Laid-Open Publication No. 53-123346 and another in Japanese Utility Model Laid-Open Publication No. 53-115246 which attempt to obviate this problem.

The bearing disclosed in Japanese Utility Model Laid-Open Publication No. 53-123346 comprises: a lubricating oil receiver disposed beneath a bearing; a plurality of partition members that stand on an inside of a bottom wall of a lubricating oil tank; and heat radiation fins that are disposed on an outer surface of the bottom wall of the lubricating oil tank. Thus, the lubricating oil discharged from the bearing is collected by the lubricating oil receiver in a portion of the lubricating oil tank which is opposite to a lubricating oil supply device. The thus collected lubricating oil then meanders in the lubricating oil tank, and is then picked up by the lubricating oil supply device again. The heat of the lubricating oil is radiated outside by virtue of the radiation fins disposed on an outer surface of the bottom wall of the lubricating oil tank while lubricating oil is meandering in this way. In the device described above, heat is radiated solely from the bottom wall of the lubricating oil tank. In addition, since the flow generated by virtue of the operation of the lubricating oil supply device is extremely limited, the high temperature lubricating oil discharged from the bearing readily gathers in the portion of the lubricating oil tank at the position opposite to the lubricating oil supply device. As a result, heat radiation from the lubricating oil tank cannot be performed efficiently.

The bearing apparatus disclosed in Japanese Utility Model laid-Open Publication No. 53-115246 is structured in such a manner that fans are provided on the rotational shaft, fins are attached to and an air duct is provided on the outer surface of the bearing, and the lubricating oil tank is divided into two sections that are communicated by a cooling pipe. This device is designed to improve the cooling effect by allowing the lubricating oil in the lubricating oil tank be cooled by the fan attached to the rotational shaft and supplying air forcedly and directly to the outer surface of the bearing. However, this involves certain economic disadvantages since the windage loss attributable to the fans is considerable and the structure of the device becomes too complicated.

An additional proposal has been made with a view to improving the cooling effect by inserting a heat pipe in the lubricating oil tank. However, an adequate cooling performance can only be obtained with this device, if its size is considerably enlarged, thus leading to economic disadvantages.

SUMMARY OF THE INVENTION

An object of the invention is to provide a bearing apparatus for a rotary machine having a horizontal rotating shaft which is capable of effectively radiating the heat from the lubricating oil tank provided beneath the bearing to supply sufficiently cooled lubricating oil to the bearing and has a simple structure relatively.

A bearing apparatus for a rotary machine having a horizontal rotating shaft according to the invention comprises a bearing for supporting the horizontal rotating shaft;

a bearing box for supporting the bearing therein;

a lubricating oil tank formed in the lower portion of the bearing box for storing the lubricating oil;

a lubricating oil supply device for picking up lubricating oil in the lubricating oil tank and supplying lubricating oil to the bearing; and oil guide means disposed beneath the bearing for allowing the lubricating oil discharged from the bearing to flow along side wall of the bearing box to be recovered in the lubricating oil tank, whereby cooled lubricating oil remained adjacent to the side wall of the lubricating oil tank is flushed by the hot discharged lubricating oil to be mixed therewith and the heat of the hot discharged lubricating oil can be effectively radiated from the side wall.

DESCRIPTION OF THE PREFERRED EMBODIMENTS

Figure 1:
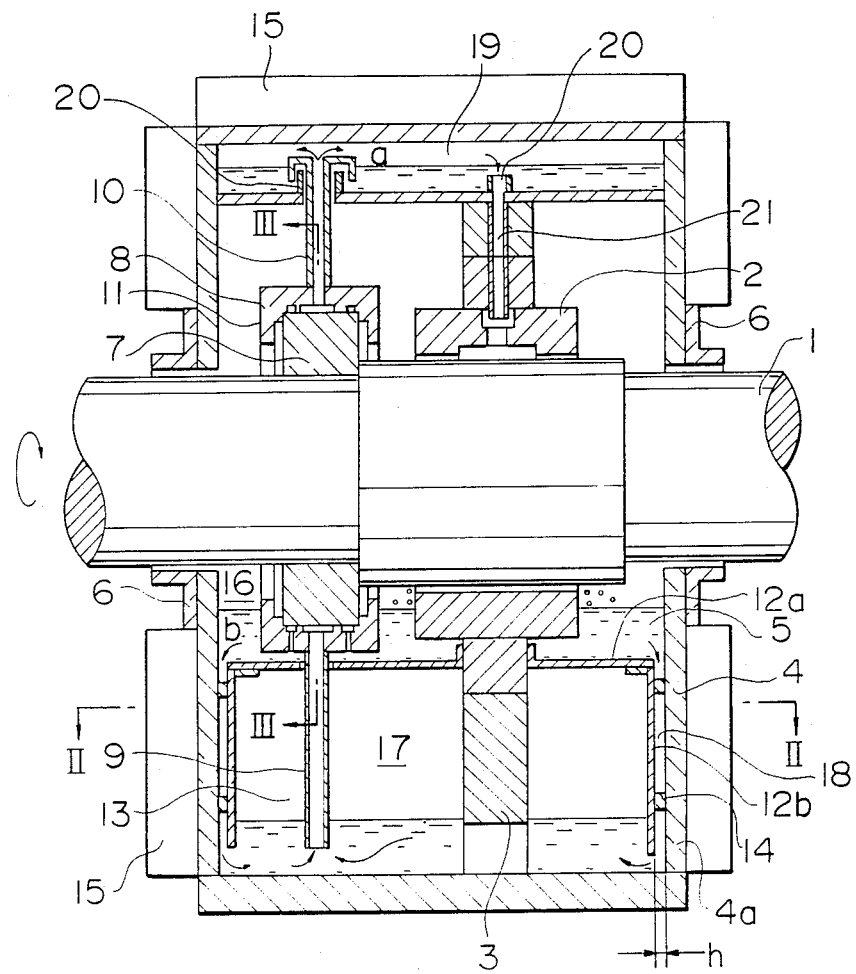
FIG. 1 is a vertical cross-sectional view of an embodiment of a bearing apparatus for a rotary machine having a horizontal rotating shaft according to the present invention.
Figure 2:
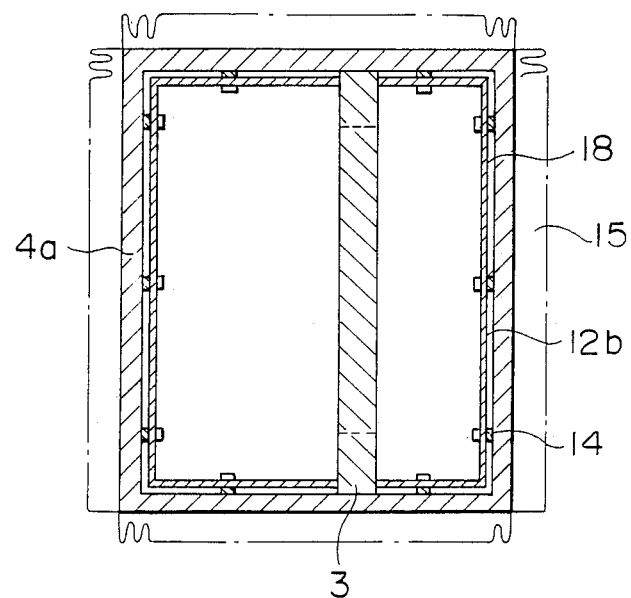
FIG. 2 is a cross-sectional view taken along line II—II of FIG. 1.
Figure 3:
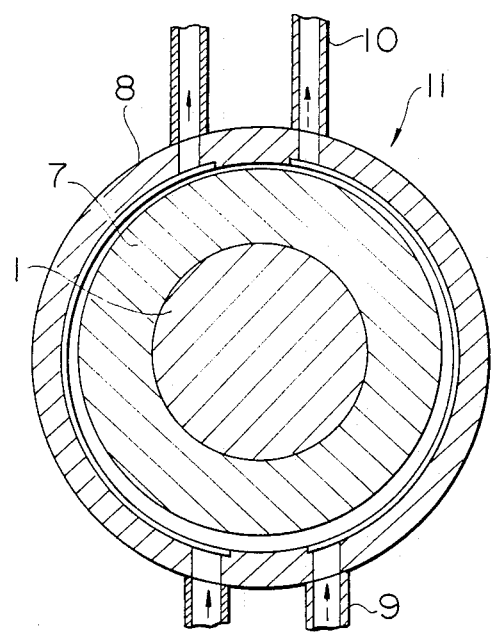
FIG. 3 is a cross-sectional view taken along line III—III of FIG. 1.

An embodiment of the present invention will now be described with reference to FIGS. 1 to 4. A main horizontal rotational shaft 1 of a rotary machine rotating shaft is supported by a slide bearing 2 which can be divided with a horizontal line into two sections. This slide bearing 2 is disposed within a bearing box 4 with a bearing frame 3. Labyrinth seals 6 are respectively provided for the right and left side walls of the bearing box 4 so that leakage of the lubricating oil is prevented.

A viscous pump 11 is disposed within the bearing box 4, this viscous pump 11 comprising an oil disc 7 secured to the main rotational shaft 1; a pump case 8 floatingly mounted around the oil disc 7 through an oil film; intake pipes 9 disposed beneath the pump case 8; and discharge pipes 10 disposed above the same.

The lower portion of the bearing box 4 is a lubricating oil tank 13 for storing lubricating oil 5. An oil guide 12a is disposed substantially horizontally beneath the bearing 2 and the viscous pump 11. In addition, an oil guide 12b is secured vertically adjacent to a side wall 4a of the bearing box 4 with a gap (h) from the side wall 4a. The lower end of the oil guide 12b is extended downward to a position adjacent to a bottom wall of the bearing box 4. Heat radiation fins 15 are secured to an outer surface of the side wall 4a with an adhesive or the like.

As a result of the presence of the oil guides 12a and 12b as described above, the lubricating oil tank 13 is divided into a lubricating oil recovery chamber 16 for receiving lubricating oil dropped from both ends of the bearing 2 and disposed in the upper portion of the lubricating oil tank 13, a lubricating oil supplying chamber 17 in which inlet openings of the intake pipes 9 of the viscous pump 11 are positioned and disposed in the lower portion of the lubricating oil tank 13, and a lubricating oil passage 18 communicating with the above-described two chambers and disposed along the side wall 4a. A relay oil tank 19 provided on an upper portion of the bearing box 4 has a bottom surface on which oil dams 20 are disposed in such a manner that the oil dams 20 confront the corresponding discharge pipe 10 of the viscous pump 11 and an inlet port 21 of the bearing 2, this relay oil tank 19 storing the lubricating oil. The discharge pipe 10 connected to the pump case 8 penetrates one of the oil dams 20 with a certain clearance and extends to the position within the relay oil tank 19. The inlet port 21 formed through the bearing frame 3 is communicated with the inner portion of the bearing 2.

The operation will be described hereinafter.

When the main rotational shaft 1 is rotated, the oil disc 7 secured to the main rotational shaft 1 is also rotated. Since the lubricating oil 5 of high viscosity adheres to the oil disc 7, a pumping effect is generated attributable to its viscous friction. The lubricating oil 5 allowed to flow along the direction of rotation attributable to the thus-generated pumping effect passes through the lubricating oil chamber formed within the pump case 8, is introduced into the discharge pipe 10, and flows into the relay oil tank 19. The lubricating oil 5 which has been mixed with the lubricating oil stored in the relay tank 19 overflows the oil dam 20, and is supplied to the inside portion of the bearing 2 via the inlet port 21. Thus, the bearing is lubricated and cooled by the thus-supplied lubricating oil 5. The lubricating oil 5 which has been supplied to the bearing 2 is discharged from both ends of the bearing 2 into the lubricating oil recovery chamber 16. The lubricating oil discharged is heated by the shearing and frictional action during the lubrication.

However, this high temperature lubricating oil cannot reach the intake pipe 9 since the lubricating oil recovery chamber 16 is separated by the oil guide 12a to be a different chamber from the lubricating oil supplying chamber 17. In addition, since an intake effect is generated in the lubricating oil supplying chamber 17 by the pumping effect of the viscous pump 11, the high temperature lubricating oil is introduced into the narrow lubricating-oil passage 18 without remaining in the lubricating oil recovery chamber 16 as shown by an arrow b of FIG. 1. The gap h of the lubricating oil passage 18 is sized as narrowly as possible by considering the performance of the viscous pump 11. As a result, when the lubricating oil 5 is passed through the oil passage 18, the flow speed thereof is increased, causing the low temperature lubricating oil adhered to the side wall 4a of the bearing box 4 to be removed. The lubricating oil 5 is, with the thus-removed low temperature lubricating oil, introduced into the lubricating oil supplying chamber 17. Accordingly, high temperature lubricating oil is always passed through the lubricating oil passage 18, so that heat radiation through the side wall 4a can be effectively performed, and the lubricating oil in the oil supplying chamber 17 always becomes cooled lubricating oil.

Furthermore, since the lubricating oil is supplied from the relay tank 19 to the bearing 2 through the inlet port 21 formed in the bearing frame 3, the lubricating oil can be supplied with certainty to the bearing 2 in comparison with the prior art oil supplying system in which the lubricating oil is simply released above the bearing 2.

Figure 4:
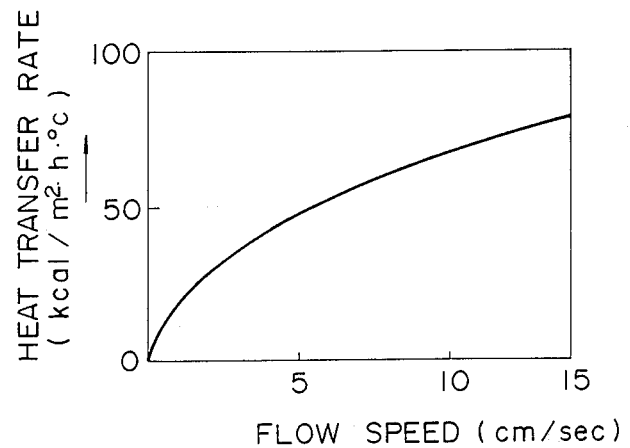
FIG. 4 is a graph which illustrates a relationship between the flow velocity of lubricating oil passing through the lubricating oil passage and the heat transfer rate.

FIG. 4 illustrates a relationship between heat transfer rate $\alpha$ and flow velocity v under an assumption that the side wall 4a is considered to be a flat plane and the lubricating oil 5 flows along a surface of the side wall 4a at a constant flow velocity v. As can be clearly seen from this graph, the faster the lubricating oil 5 flows, the more the heat transfer rate $\alpha$ increases.

In general, heat radiation quantity Q through the side wall 4a can be obtained from the following formula (1).

$$Q = \alpha(t_0 - t_1)S \qquad (1)$$

where
$\alpha$: heat transfer rate (kcal/m²h °C.)
$t_0$: temperature of the surface of a substance (°C.)
$t_1$: temperature of fluid (°C.)
S: heat transfer area of a substance (m²)

In order to keep at low temperature the lubricating oil 5 in the lubricating oil tank 13, it is needed for the size of the lubricating oil tank to be enlarged to enlarge the heat transfer area or the heat transfer rate $\alpha$ to be improved. In the practical viewpoint, it is impossible for the size of the bearing apparatus to be enlarged due to the structural limitation. Therefore, the heat transfer rate $\alpha$ is a major factor for improving the cooling performance.

The gap h of the lubricating oil passage 18 in the lubricating oil tank 13 which influences the heat transfer rate $\alpha$ is determined by considering surface condition and a state of convection along the surface. It has been confirmed that an excellent radiation effect can be obtained by arranging the gap h to be in a range 1 mm < h < 20 mm on the basis of the experimental results.

In addition, when heat radiation fins 15 are secured to the side wall 4a forming the lubricating oil passage 18 and the heat radiation area is increased, further improved cooling performance can be obtained. Although the viscous pump is used as the lubricating oil supply device in the embodiment described with reference to FIG. 1, a similar effect can be obtained also in lubricating oil supply devices having a structure which are capable of generating lubricating oil flow in the lubricating oil tank such as a scooping oil supply device with a thrust coolar, a chain device and an oil ring device.

Figure 5:
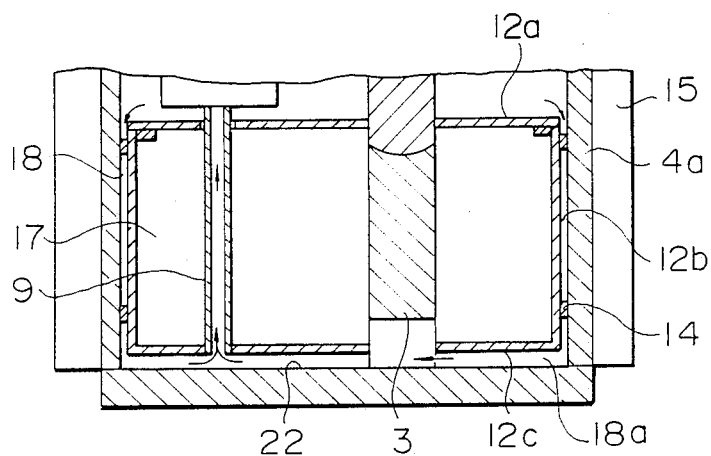
FIG. 5 is a vertical cross-sectional view of another embodiment of the bearing apparatus according to the present invention, in which only the lower portion thereof is illustrated.

In an embodiment shown in FIG. 5, another oil guide member 12c is provided along a bottom wall of the bearing box 4 and is connected to the oil guide member 12b at a circumferential end thereof so that a second lubricating oil passage 18a is provided. Further, the oil guide members 12a, 12b, 12c are made of a heat insulating material such as ceramics. With the foregoing structure, when the high temperature lubricating oil passes through the oil passages 18, 18a, the heat transfer toward the inside of the lubricating oil tank is restricted and the heat gradient to the walls is increased, so that the heat radiation from the walls is improved.

Figure 6:
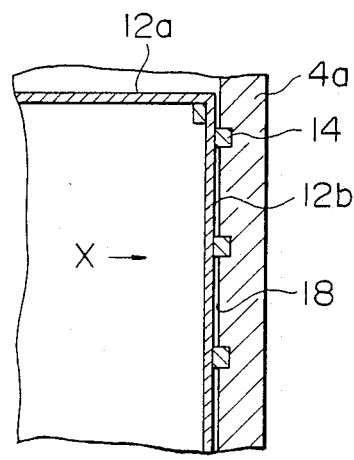
FIG. 6 is an enlarged cross-sectional view of a modified example of a first lubricating oil passage.
Figure 7:
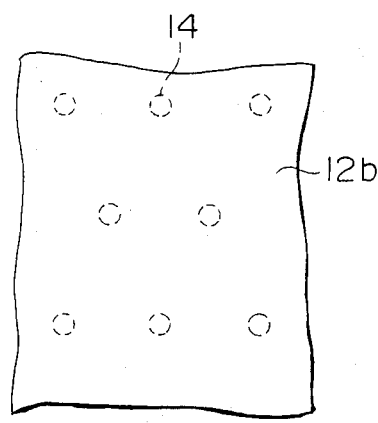
FIG. 7 is a view taken in the direction of the arrow X of FIG. 6.

FIGS. 6 and 7 show a modified example of the lubricating oil passage 18, in which baffle plates 14 are provided in zigzag form along the direction of the flow of the lubricating oil. The lubricating oil collides with the baffle plates 14 and the lubricating oil flow becomes a scattered stream. Therefore, the capability of removing the low temperature lubricating oil adhered to the side wall 4a is improved, and the temperature distribution in the lubricating oil passage 18 can be made uniform while obtaining an excellent heat radiation effect.

Alternatively, the baffle plates 14 may be permanent magnets embedded in the side wall 4a. In this case, since the oil guide member 12b is attracted and held by the permanent magnets 14, assembly and disassembly of the apparatus can be performed easily.

Although the lubricating oil passage 18 is formed along the entire circumference of the side wall 4a of the bearing box 4 in the embodiments above, the lubricating oil passage 18 may be formed along only a part of the side wall 4a in a case that the capacity of the bearing is small and only a small quantity of lubricating oil is needed.

Although in the above-described embodiments, the oil guide members 12a and 12b are individually provided, they may be formed integrally to form a box-like body to be sunk in the lubricating oil tank 13 with the opening thereof faced downward.

As described above, with the bearing apparatus according to the present invention, lubricating oil can be effectively cooled down by passing lubricating oil, which has been heated after it has contributed to the lubrication, in contact with the side wall of the lubricating oil tank. Consequently, the lubricating oil supply device always supplies low temperature lubricating oil to the bearing, so that the reliability of the bearing can be improved.

What is claimed is:

1. A bearing apparatus for a rotary machine having a horizontal rotating shaft comprising:
    a bearing for supporting said horizontal rotating shaft;
    a bearing box for supporting said bearing therein;
    a lubricating oil tank formed in the lower portion of said bearing box for storing lubricating oil and comprising a recovery chamber disposed in the upper portion of said bearing box for recovering the lubricating oil discharged from said bearing and a lubricating oil supplying chamber disposed beneath said recovery chamber for storing the lubricating oil to be supplied to said bearing;
    a lubricating oil supply device for picking up the lubricating oil in said lubricating oil supplying chamber to supply it to said bearing; and
    a first lubricating oil passage formed by a gap created by at least of a part of a side wall of said bearing box and a first oil guide member which stands adjacent to said at least a part of said side wall and communicating said recovery chamber with said lubricating oil supplying chamber.

2. A bearing apparatus according to claim 1, wherein said first oil guide member is made of a heat insulating material.

3. A bearing apparatus according to claim 1, wherein said first oil guide member is attracted and secured by permanent magnets disposed in a zigzag form on an inner surface of said side wall of said bearing box.

4. A bearing apparatus according to claim 1, wherein a plurality of baffle plates for making the lubricating oil flow in said first lubricating oil passage a scattered stream.

5. A bearing apparatus according to claim 1, wherein said first oil guide member is extended along the overall circumference of said side wall of said bearing box, a second oil guide member is provided along a bottom wall of said bearing box, and said second oil guide member is connected, at circumferential end portion thereof, to the lower end of said first oil guide member.

6. A bearing apparatus according to claim 1, wherein at least an outer surface of said side wall of said bearing box is provided with heat radiation fins.

7. A bearing apparatus for a rotary machine having a horizontal rotating shaft comprising:
    a bearing for supporting said horizontal rotating shaft;
    a bearing box for supporting said bearing therein;
    a lubricating oil tank formed in the lower portion of said bearing box for storing lubricating oil, and comprising an upper lubricating oil chamber for recovering lubricating oil discharged from said bearing and a lower lubricating oil chamber for storing lubricating oil to be supplied to said bearing, said upper and lower lubricating oil chambers being separated from each other by a partition plate disposed substantially horizontally within said lubricating oil tank;
    a lubricating oil supply device for picking up lubricating oil in said lower lubricating oil chamber to supply it to said bearing; and
    a first lubricating oil passage formed by a gap formed by at least a part of a side wall of said bearing box and a first oil guide member which stands adjacent to said at least a part of said side wall and communicating said upper oil chamber with said lower oil chamber.

8. A bearing apparatus according to claim 7, wherein said first oil guide member is made of a heat insulating material.

9. A bearing apparatus according to claim 7, wherein said first oil guide member is attracted and secured by permanent magnets disposed in a zigzag form on an inner surface of said side wall of said bearing box.

10. A bearing apparatus according to claim 7, wherein a plurality of baffle plates for making the lubricating oil flow in said first lubricating oil passage a scattered stream are provided in said first lubricating oil passage.

11. A bearing apparatus according to claim 7, wherein said first oil guide member is extended along the overall circumference of said side wall of said bearing box, a second oil guide member is provided along a bottom wall of said bearing box, and said second oil guide member is connected, at circumferential end portion thereof, to the lower end of said first oil guide member.

12. A bearing apparatus according to claim 7, wherein at least an outer surface of said side wall of said bearing box is provided with heat radiation fins.

13. A bearing apparatus for a rotary machine having a horizontal rotating shaft comprising:
- a bearing for supporting said horizontal rotating shaft;
- a bearing box for supporting said bearing therein;
- a lubricating oil recovery chamber disposed beneath said bearing in said bearing box for recovering lubricating oil discharged from said bearing;
- a lubricating oil supply chamber disposed beneath said lubricating oil recovery chamber in said bearing box and for storing lubricating oil to be supplied to said bearing;
- a lubricating oil supply device for picking up lubricating oil in said lubricating oil supply chamber to supply it to said bearing; and
- a first lubricating oil passage formed by a gap formed by at least a part of a side wall of said bearing box and a first oil guide member which stands adjacent to said at least a part of said side wall and communicating said recovery chamber with said lubricating oil supply chamber.

14. A bearing apparatus according to claim 13, wherein said first oil guide member is made of a heat insulating material.

15. A bearing apparatus according to claim 13, wherein said first oil guide member is attracted and secured by permanent magnets disposed in a zigzag form on an inner surface of said side wall of said bearing box.

16. A bearing apparatus according to claim 13, wherein a plurality of baffle plates for making the lubricating flow in said first lubricating oil passage a scattered stream are provided in said first lubricating oil passage.

17. A bearing apparatus according to claim 13, wherein said first oil guide member is extended along the overall circumference of said side wall of said bearing box, a second oil guide member is provided along a bottom wall of said bearing box, and said second oil guide member is connected, at circumferential end portion thereof, to the lower end of said first oil guide member.

18. A bearing apparatus according to claim 13, wherein at least an outer surface of said side wall of said bearing box is provided with heat radiation fins.

19. A bearing apparatus for a rotary machine having a horizontal rotating shaft comprising:
- a bearing for supporting said horizontal rotating shaft;
- a bearing box for supporting said bearing therein;
- a lubricating oil tank formed in the lower portion of said bearing box for storing lubricating oil;
- a box-like body sunk in said lubricating oil tank with the opening thereof faced downward, this boxlike body dividing said lubricating oil tank into an upper lubricating oil chamber for recovering lubricating oil discharged from said bearing, a lower lubricating oil chamber for storing lubricating oil to be supplied to said bearing, and a first lubricating oil passage which communicates said upper lubricating oil chamber with said lower lubricating oil chamber; and
- a lubricating oil supply device for picking up lubricating oil in said lower lubricating oil chamber to supply it to said bearing.

20. A bearing apparatus according to claim 19, wherein said box-like body is made of a heat insulating material.

21. A bearing apparatus according to claim 19, wherein said box-like body is attracted and secured by permanent magnets disposed in a zigzag form on an inner surface of said side wall of said bearing.

22. A bearing apparatus according to claim 19, wherein a plurality of baffle plates capable of making the lubricating oil flow in said first lubricating oil passage a scattered stream are provided in said first lubricating oil passage.

23. A bearing apparatus according to claim 19, wherein at least an outer surface of said side wall of said bearing box is provided with heat radiation fins.

24. A bearing apparatus for a rotary machine having a horizontal rotating shaft rotating machine comprising:
- a bearing for supporting said horizontal rotating shaft;
- a bearing box for supporting said bearing therein;
- a lubricating oil tank formed in the lower portion of said bearing box for storing lubricating oil;
- a hollow body sunk in said lubricating oil tank and dividing said lubricating oil tank into an upper lubricating oil chamber for recovering lubricating oil discharged from said bearing and a lubricating oil passage for supplying lubricating oil to said bearing; and
- a lubricating oil supply device for picking up lubricating oil in the lubricating oil passage to supply it to said bearing.

25. A bearing apparatus according to claim 24, wherein said hollow body is made of a heat insulating material.

26. A bearing apparatus according to claim 24, wherein said hollow body is attracted and secured by permanent magnets disposed in a zigzag form on an inner surface of said side wall of said bearing box.

27. A bearing apparatus according to claim 24, wherein a plurality of baffle plates capable of making the lubricating oil flow in said lubricating oil passage a scattered stream are provided in said lubricating oil passage.

28. A bearing apparatus according to claim 24, wherein at least an outer surface of said side wall of said bearing box is provided with heat radiation fins.

29. A bearing apparatus for a rotary machine having a horizontal rotating shaft comprising:
- a bearing for supporting said horizontal rotating shaft;
- a bearing box for supporting said bearing therein;
- a lubricating oil tank formed in the lower portion of said bearing box for storing lubricating oil;

oil guide means disposed beneath said bearing for allowing lubricating oil discharged from said bearing to flow along the side wall of said bearing box to be recovered in said lubricating oil tank;

a relay tank disposed in the upper portion of said bearing box for supplying the lubricating oil to said bearing; and a lubricating oil supply device for picking up the lubricating oil in said lubricating oil tank into said relay tank.

* * * * *